| United States Patent | [15] | 3,674,788 |
|---|---|---|
| Thomas et al. | [45] | July 4, 1972 |

[54] DIPYRIDYLIUM QUATERNARY DIHALIDE HALOGEN COMPLEXES

[72] Inventors: Robert M. Thomas; Fred R. Gerns; John L. Sands, all of West Lafayette, Ind.

[73] Assignee: Great Lakes Chemical Corporation, West Lafayette, Ind.

[22] Filed: Jan. 15, 1971

[21] Appl. No.: 106,934

Related U.S. Application Data

[63] Continuation-in-part of Ser. No. 770,082, Oct. 23, 1968, Pat. No. 3,641,041.

[52] U.S. Cl. .................. 260/250 R, 260/296 D, 260/296 H, 71/92
[51] Int. Cl. ...................................................... C07d 51/02
[58] Field of Search.................... 260/296 H, 296 D, 250 R

[56] References Cited

UNITED STATES PATENTS

| 3,202,500 | 8/1965 | Homer | 71/92 |
|---|---|---|---|
| 3,308,124 | 3/1967 | Braunholtz et al. | 260/250 |
| 3,311,535 | 3/1967 | Whipp | 424/250 |
| 3,332,959 | 7/1967 | Braunholtz | 260/296 |

Primary Examiner—Alan L. Rotman
Attorney—Gordon W. Hueschen and Talivaldis Cepuritis

[57] ABSTRACT

Halogen complexes of dipyridylium quaternary dihalides which are bacteriocidal and herbicidal agents and useful as defoliants and desiccants, particularly as cotton defoliant-desiccants.

This invention relates to novel quaternary dihalide halogen complexes, more particularly to halogen complexes of N,N'-ethylene-2,2'-dipyridylium dihalides and to their use as herbicides, especially for growing vegetation, which is substantially severely damaged or completely destroyed by herbicidal treatment therewith, and as defoliants and desiccants, particularly as superior harvest aid chemicals having special application in the preparation of cotton for harvest by defoliation and desiccation without concurrent suppression of the opening of mature bolls of cotton plants treated therewith.

5 Claims, No Drawings

DIPYRIDYLIUM QUATERNARY DIHALIDE HALOGEN COMPLEXES

RELATED APPLICATION

This application is a continuation-in-part of our prior-filed co-pending application, Ser. No. 770,082, filed Oct. 23, 1968, in which restriction was required, now U.S. Pat. No. 3,641,041, issued Feb. 8, 1972.

OBJECTS OF THE INVENTION

It is an object of the invention to provide novel dipyridylium quaternary dihalide halogen complexes. Another object is the provision of methods and compositions for their use as herbicides and defoliant-desiccants. Other objects will be apparent to those skilled in the art to which this invention pertains.

BACKGROUND OF INVENTION

Certain halogen addition products of quaternary halides are known in the art. They have been used to sterilize water (U.S. Pat. No. 3,152,073), as germicidal detergents (U.S. Pat. No. 2,746,928) as anti-bacterial and anti-fungal agents (U.S. Pat. No. 2,868,686) and as germicides (U.S. Pat. No. 3,028,301, U.S. Pat. No. 2,679,533). Two of the dipyridylium dihalides used as starting materials to produce the novel halogen complexes of this invention, viz., N,N'-ethylene-2,2'-dipyridylium dibromide and N,N'-dimethyl-4,4'-dipyridylium dichloride, are used commercially as herbicides. (See U.S. Pat. No. 2,823,987 and U.S. Pat. No. 2,972,528. See also U.S. Pat. No. 3,202,500 and U.S. Pat. No. 3,332,959.)

As stated, certain halogenated quaternary ammonium complexes are known in the art. The tetrabutyl ammonium tribromide type complex is disclosed and studied in *Journal American Chemical Society*, Volume 73, page 425 (1951). It was there recognized that polyhalide complexes of monoquaternary ammonium halides have long been known. In many cases such compounds have been prepared as solid derivatives of the parent compound.

DESCRIPTION OF THE INVENTION

The following is a description of the manner of making and using and the best mode contemplated of carrying out the invention.

The quaternary dihalide halogen complexes of this invention are powerful herbicides. In contrast to their parent starting quaternary dihalides, they are superior defoliating-desiccating agents which are especially useful as cotton defoliant-dessicants and which exhibit no suppression of the opening of mature bolls of cotton plants treated therewith. Those which are bromine complexes are particularly useful for this purpose. The discovery that the activity of the starting quaternary dihalides is improved and altered in this manner by conversion to the halogen complexes of this invention is of substantial importance in the cotton industry because harvest aid defoliation and desiccation procedure better prepares the mature cotton plants for mechanical harvest by reducing the trash collected along with the cotton bolls and eliminating green leaves which would result in staining of the cotton linters during harvest. Whether desiccation or defoliation is preferred in a particular case depends upon many conditions and factors, including the type of harvesting equipment to be employed, but in any event such trash and green leaf reduction obviously up-grades the quality of the harvested cotton, and any improved harvest aid in this area would consequently be of considerable importance. One especially critical factor in the use of such a desiccant or defoliant as a harvest aid is its effect on the opening of the mature cotton bolls, which should not be impeded by the harvest aid agent of procedure employed. The halogen complexes of this invention are clearly superior to the parent starting quaternary dihalides, inter alia, in this respect. Their high degree of desiccant-defoliant effectiveness, especially coupled with their non-interference with mature boll opening, certainly could not have been predicted on a basis of chemical structure. Their efficient defoliating and desiccating activity also renders them useful to rapidly clear jungle areas and railroad and utility rights-of-way.

In addition, the halogen complexes of this invention have anti-microbial activity and can be used as anti-bacterial agents. They are active against gram positive and gram negative bacteria.

The compounds of this invention can be used as defoliant-desiccants by applying them to the area to be defoliated in an amount effective to at least substantially defoliate and/or desiccate the flora of the treated area. Generally, up to 4 pounds per acre is employed. Higher amounts are also effective but are wasteful and unnecessarily expensive and ordinarily do not result in increased defoliation. Generally, an amount of the selected compound between about 0.1 and 2.0 pounds per acre, preferably between 0.2 and 1.0 lb/acre, is employed, the exact amount depending on the type of plants to be defoliated, their density and the percentage lost by drift during application. For example, mature cotton plants planted at normal densities can be sufficiently defoliated (85 percent) to permit mechanical picking with almost no pin trash by applying N,N'-ethylene, 2,2'-dipyridylium bistribromide (GLC 506) uniformly thereto at a rate of 0.125 to 0.2 lb/acre. At higher treatment levels (0.25 to 3 lbs/acre), 95–98 percent defoliation can be achieved. Lower treatment levels appear to favor desiccation, whereas higher treatment levels appear to favor defoliation.

The compounds of this invention can also be used as herbicides by applying them to the area to be devegetated. Usually they are applied for this purpose in an amount effective to at least substantially severely damage and preferably kill the flora of the treated area. Generally, an amount less than 25 pounds per acre is employed. Higher amounts are also effective but ordinarily do not result in increased defoliation. Usually, the selected compound is employed in an amount between about 0.2 and 10 pounds per acre, preferably between about 0.5 and 5 pounds per acre, the exact amount depending on the exact result desired, the type of plants to be killed, their density, age and extent of growth, and the percentage of herbicide lost by drift during application. For example, growing pigweed, tomato, radish, cucumber, red kidney bean plants, wheat, Johnson grass, oats, cotton, etc., are all killed or severely damaged by applying a complex of the invention, e.g., 1,1'-ethylene-2,2'-dipyridylium bistribromide (GLC 506), uniformly thereto at an early post-emergence stage at a rate of 0.5 to 2 pounds per acre. At higher treatment levels (2.5 to 10 pounds per acre), 100 percent kill of virtually all types of plants can be achieved. Except for their water and most organic solvent insolubility and their ability to halogenate compounds mixed therewith which are readily halogenatable with elemental halogen, the compounds of this invention can be used as herbicides in the same manner as known herbicides, e.g., the corresponding starting dipyridylium quaternary dihalides. For a description of such a manner of using, see U.S. Pat. Nos. 3,202,500 and 3,332,995.

The exact results, whether herbicidal or cotton defoliant-desiccant results, and the exact amount of active material of the invention necessary to accomplish the same, will as usual vary somewhat depending upon climatic conditions such as temperature and humidity.

In order to apply the halogen complex uniformly, whether as a defoliant-desiccant or herbicide, it is usually applied in combination with an inert or synergizing carrier, which may be either solid or liquid but which is preferably solid and pulverulant, at least before dilution and application. Because the complex can rapidly lose its elemental halogen in the presence of readily halogenated compounds, the carrier (if susceptible to halogenation) is usually mixed with the halogen complex just prior to its application to the flora to be treated, or the complex is applied dry mixed with a powder carrier which will adhere to the plants. After admixture with the selected carrier, the composition is applied in any conventional manner to the flora to be treated. It can be applied as a suspension in water or in a non-ionic carrier, e.g., dimethylformamide, gasoline, kerosene, or light oil.

In any application of the compounds of the invention to flora, e.g., for hebicidal, defoliant, desiccation or wilt purposes, especially when in liquid suspension form, it is advantageous to employ a non-ionic sticker-spreader (adherent) of the du Pont WK (dodecyl ether of polyethylene glycol) type or the Colloidal Chemical Corp. Multifilm X-77 (compounded product of alkyl aryl polyethoxyethanol and free fatty acids) type, and such material is most advantageously incorporated in liquid preparations just prior to use.

In addition to the foregoing, the compositions of the invention may advantageously contain inert sticker-spreaders or adherents for increasing adherence of the composition to the plant, inert fillers or diluents such as silica, calcium silicate, magnesium silicate, clays, gypsum and the like, inert dispersants or wetting agents, and the like, as more fully illustrated hereinafter, as well as other non-reactive ingredients having an additive synergistic or independent herbicidal and/or desiccant-defoliant effect, e.g., Paraquat or Diquat, if desired.

The active compounds of this invention are N,N'-lower-alkylene-dipyridylium and N,N'-diloweralkyl-dipyridylium dihalide halogen complexes, i.e., hexahalides or bistrihalides, which can be represented by the following generic structural formula:

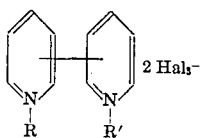

$2\text{ Hal}_3^-$ wherein R and R' are lower-alkyl of one to eight carbon atoms and preferably one to three atoms, inclusive, when the dipyridylium group is 3,3'- or 4,4'-dipyridylium, and collectively alkylene of one to four carbon atoms and preferably two or three carbon atoms, inclusive, when the dipyridylium group is 2,2'-dipyridylium; $\text{Hal}_3^-$ is a trihalide ion in which the halogen has an atomic weight from 35 to 80, inclusive, e.g., $\text{Br}_3^-$, $\text{ClBr}_2^-$, $\text{Cl}_2\text{Br}^-$, preferably $\text{Br}_3^-$. For example, the dipyridylium moiety can be 2,2'-, 3,3'-, 4,4'- or mixtures thereof. When the dipyridylium group is 3,3'- or 4,4'-, R and R' each can be $\text{CH}_3$, $\text{C}_2\text{H}_5$, n—$\text{C}_3\text{H}_7$, i—$\text{C}_3\text{H}_7$, t-butyl, or octyl. When the dipyridylium group is 2,2'-, R and R' collectively can be methylene, ethylene trimethylene, propylene, etc. The halogen in $\text{Hal}_3^-$ can be chlorine, bromine or a combination of chlorine and bromine.

It will be apparent to those skilled in the art that although it is generally accepted that elemental and anionic halogen combine to form the trihalide anion [$\text{Hal}_3^-$], because the halogen is loosely bonded, the formula $\text{Hal}^- \cdot \text{Hal}_2$ also reasonably accurately depicts the trihalide complex.

The following are representative compounds of this invention defined by the above formula.

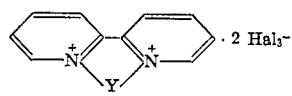

$\cdot 2\text{ Hal}_3^-$

| Compound | Y | $\text{H}_2\text{I}_3^-$ |
|---|---|---|
| 1 | $\text{CH}_2$ | $\text{Br}_3^-$ |
| 2 | $\text{CH}_2$ | $\text{ClBr}_2^-$ |
| 3 | $\text{C}_2\text{H}_4$ | $\text{Br}_3^-$ |
| 4 | $\text{C}_2\text{H}_4$ | $\text{ClBr}_2^-$ |
| 5 | $\text{C}_2\text{H}_4$ | $\text{Cl}_2\text{Br}^-$ |
| 6 | $\text{C}_2\text{H}_4$ | $\text{Cl}_3^-$ |
| 7 | $(\text{CH}_3)\text{C}_2\text{H}_3$ | $\text{Br}_3^-$ |
| 8 | $\text{C}_3\text{H}_6$ | $\text{Br}_3^-$ |
| 9 | $\text{C}_3\text{H}_6$ | $\text{ClBr}_2^-$ |
| 10 | $\text{C}_3\text{H}_6$ | $\text{Cl}_2\text{Br}^-$ |

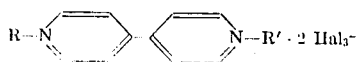

$\cdot 2\text{ Hal}_3^-$

| Compound | R | R' | $\text{Hal}_3^-$ |
|---|---|---|---|
| 11 | $\text{CH}_3$ | $\text{CH}_3$ | $\text{Br}_3^-$ |
| 12 | $\text{CH}_3$ | $\text{CH}_3$ | $\text{ClBr}_2^-$ |
| 13 | $\text{CH}_3$ | $\text{CH}_3$ | $\text{Cl}_2\text{Br}^-$ |
| 14 | $\text{CH}_3$ | $\text{CH}_3$ | $\text{Cl}_3^-$ |
| 15 | $\text{C}_2\text{H}_5$ | $\text{C}_2\text{H}_5$ | $\text{Br}_3^-$ |
| 16 | $\text{C}_2\text{H}_5$ | $\text{C}_2\text{H}_5$ | $\text{ClBr}_2^-$ |
| 17 | $\text{C}_2\text{H}_5$ | $\text{C}_2\text{H}_5$ | $\text{Cl}_2\text{Br}^-$ |
| 18 | n-$\text{C}_3\text{H}_7$ | n-$\text{C}_3\text{H}_7$ | $\text{Br}_3^-$ |
| 19 | i-$\text{C}_3\text{H}_7$ | i-$\text{C}_3\text{H}_7$ | $\text{Br}_3^-$ |

The presence of non-interfering functional groups on the alkyl groups attached to the nitrogen atoms of the 3,3'- and 4,4'-di-pyridylium molecules and/or an alkyl group on one or more of the dipyridylium ring carbon atoms will not affect the usefulness of the dipyridylium dihalide halogen complexes as halogenating and herbicidal agents. Such substituted compounds are therefore equivalents of the corresponding unsubstituted compounds. For example, the 2,2'-dipyridylium compounds can have a lower-alkyl, preferably methyl, group at one or more of the 4, 5, 6, 4', 5' and 6' positions and the 4,4'-dipryidylium compounds at one or more of the 2, 3, 5, 6, 2', 3', 5' and 6' positions, and one or both but preferably only one of R and R' is lower-alkyl in which the terminal carbon atom is substituted, e.g., with halogen, carboxyl, carbo-lower-alkoxy, phenyl, substituted phenyl, e.g., halophenyl, bromophenyl, nitrophenyl, tolyl, xylyl, etc.

Such compounds are solids, usually crystalline and colored when they are formed from elemental halogen. They are substantially insoluble in water and most organic solvents. The elemental halogen used to form the trihalide anion is titratable and, when formed from two molar equivalents of halogen, the titer is usually 80-98 percent of theory. Because the halogen is titratable, they can be used as halogenating agents.

Such compounds are prepared by mixing about two molar equivalents of the selected halogen or mixture of halogens, e.g., $\text{Cl}_2$, $\text{Br}_2$, ClBr, with the selected starting diquaternary dihalide. This can be conducted in the presence of a solvent normally used for halogenation reactions, e.g., glacial or aqueous acetic acid, chloroform, carbon tetrachloride, water or aqueous NaBr or NaCl. The choice of solvent is determined by the solubility of starting quaternary salt therein. For this reason, aqueous systems are generally preferred.

The reaction is preferably conducted at between $-10°$ and $25°$ C., the lower temperature limit being determined by the solubility of the reactants in the selected solvent system and the upper temperature limit being determined by the rate of decomposition of the product and/or side reactions which may develop at higher temperatures.

If a mixed elemental halogen complex is desired, the halogens can be added concurrently or successively in amounts calculated to produce the desired molar ratio, or halogen in the starting diquaternary dihalide can be allowed to remain therein by use of less than two moles of alkali metal halide, or use of a metal halide containing the same halogen as in the starting dihalide, but different from the halogen of the elemental halogen employed.

If the starting quaternary dihalide is dichloride, simultaneously with the formation of the halogen, e.g., bromine, complex, it can be reacted with two molar equivalents of alkali metal bromide, e.g., NaBr or KBr, to form the quaternary hexabromide. Reaction with one molar equivalent of the alkali metal salt produces a mixed quaternary dihalide complex.

The starting quaternary dihalides are prepared by reacting 2,2'-, 3,3'- or 4,4'-dipyridyl with an amount of the selected alkylating agent sufficient to quaternize both nitrogen atoms. Thus, at least two molar equivalents of the selected alkyl chloride or bromide and at least one molar equivalent of the selected alkylene dichloride or dibromide is employed. Ordinarily, a large excess of these amounts is employed. Conventional quaternizing conditions are used. See U.S. Pat. Nos. 2,823,987, 3,202,500 and 3,332,959, Homer et al., J. Chem. Soc. (1960) 2498.

The following illustrate the making and using of the compounds of this invention which is not limited thereto.

Preparation N,N'-trimethylene-2,2'-dipyridylium dibromide

A mixture of 2,2'-dipyridyl (0.077 mole) and 1,3-propylene dibromide (0.39 mole) was stirred under reflux for 15 hours. Acetone was added and the product which precipitated was collected by filtration, recrystallized and decolorized with Darco activated charcoal in boiling methanol. The product was isolated in 94 percent yield in two crops melting at 322° and 317°, respectively.

EXAMPLES 1-3

The complexes shown in Table I were prepared by the addition of a solution of the corresponding dipyridylium quaternary dibromide in water to a solution of two molar equivalents of bromine in aqueous NaBr at room temperature.

For a typical example, N,N'-ethylene-2,2'-dipyridylium dibromide dibromine complex was prepared by adding with stirring a solution of 760g. (0.76 M) of N,N'-ethylene-2,2'-dipyridylium dibromide to 249 g. of bromine in 1,500 ml. of $H_2O$ containing 200 g. NaBr. The complex which precipitated immediately was collected, washed with water and air dried, yielding 962 g. (92.5 percent) of the dibromine complex. Halogen titration with KI-thiosulfate in the usual way showed 94.5 percent of theory of titratable halogen.

TABLE I

| | Structure | Yield, percent | M.P., °C | Percent $Br_2$ by wt. | $Br_2$ titer percent theory |
|---|---|---|---|---|---|
| 1 | (structure) $2Br_3^-$ 6,7-dihydrodipyrido[1,2-a:2',1'-c]pyrazidiinium bis-tribromide (commonly, N,N'-ethylene-2,2'-dipyridylium bistribromide). | 92.5 | 170-185 | 48 | 94.5 |
| 2 | (structure) $2Br_3^-$ 7,8-dihydro-6H-dipyrido[1,2-a:2',1'-c][1,4]diazepidiinium bistribromide, | 80 | 161-163 | 47 | 98 |
| 3 | $CH_3-N^+$ (structure) $^+N-CH_3 2Br_3^-$ 1,1'-dimethyl-4,4'-dipyridylium bistribromide (commonly, N,N'-dimethyl-4,4'-dipyridylium bistribromide). | 88 | 255(d) | 48 | 95 |

EXAMPLE 4

N,N-Dimethyl-4,4'-dipyridylium Bischlorodibromide

A solution of 64.3 g. (0.25 mole) N,N'-dimethyl-4,4'-dipyridylium dichloride in 160 g. of water was added with stirring to a solution of 88 g. (0.55 mole) of bromine and 32.2 g. (0.55 mole) of sodium chloride in 250 ml. of water.

The yellow-orange bromochloro complex precipitated from the solution. Upon washing with water and drying, the complex titrated 82% of theory halogen.

Preparation N,N'-Di-n-propyl-4,4'-dipyridylium dibromide

N,N-Dipropyl-4,4'-dipyridylium dibromide was prepared by stirring a mixture of 15.6 g. (0.1 mole) of 4,4'-dipyridyl and 50 g. (0.407 mole) of n-propyl bromide in 100 ml. of n-propanol for 24 hours under reflux. The reaction mixture was stripped to dryness under vacuum and the residue slurried with acetone. The product was filtered and washed with acetone.

EXAMPLE 5

N,N'-Di-n-propyl-4,4'-dipyridylium bistribromide

A solution of 40.2 g. (0.1 mole) of N,N'-di-n-propyl-4,4'-dipyridylium dibromide in 100 ml. of water was stirred into a solution of 35 g. (0.22 mole) of bromine and 22.5 g. (0.22 mole) of sodium bromide in 60 ml. of water. The orange-colored bromine complex precipitated immediately. It was collected by suction filtration and washed with water.

Titration of bromine by the standard thiosulfate method showed an active bromine titer of 95 percent of theory.

EXAMPLE 6

N,N'-Ethylene-2,2'-dipyridylium bischlorodibromide

Bromine, 88 g. (0.55 mole), was introduced into a solution of 32.2 g. (0.55 mole) of sodium chloride in 250 ml. of water. A solution of 64.3 g. (0.25 mole) of N,N'ethylene 2,2'-dipyridylium dichloride in 158 g. of water was then added with stirring. The yellow product precipitated.

Upon washing with water and drying, the product titrated 85 percent of theory halogen.

PHYSICAL COMPARISON OF COMPOUNDS OF THE INVENTION WITH PARENT

The compound of Example 1 (code marked GLC 506) was compared with the precursor material (code marked GLC-D).

It is surprising that the complex is insoluble in water whereas the precursor is completely soluble. The radical change in water solubility indicates a change in the ionic nature of the quaternary when complexed with bromine. Table II shows a comparison of physical properties of the compound of Example 1 and its precursor.

TABLE II

Physical Differences Between Bromine Complex GLC 506 and its Parent Quaternary Salt GLC-D a. Color
    GLC-506—yellow
    GLC-D—greenish yellow b. Melting Points
    GLC-506—195° C. (95% titer, as % of theory)
    GLC-D—320° C.

c. Solubility

| | GLC-506 | GLC-D |
|---|---|---|
| DMSO | sol. | sol. |
| benzene | insol. | insol. |
| acetic acid | insol. | insol. |
| methylcyclohexane | insol. | insol. |
| carbon tetrachloride | insol. | insol. |
| tetrahydrofuran | insol. | insol. |
| water | insol. | sol. |
| dimethylformamide | sol. | insol. | d. Raman spectra, in solution and in the solid state, show the product GLC-506 to contain the tribromide anion $[Br-Br-Br]^-$.

USE AS COTTON DEFOLIANTS AND DESICCANTS

The bromine complexes of Examples 1 and 3 were field tested as cotton defoliant-desiccants under the code numbers 506 and 514, respectively.

Because of their insolubility in water and other common solvents, the test compounds were made up into 50 percent wettable powder formulations for field test purposes. These are recommended for use upon dilution with water in amount up to about 50 gallons per acre, but preferably no more than about 20–30 gallons per acre, with an application rate of 0.25–4, preferably 0.5–3, pounds of wettable powder per acre. The wettable powders contained 50 percent by weight of active ingredient plus 50 percent by weight of a premix preparation of the composition HiSil (silica) 92 percent, Marasperse N (sodium lignosulfonate) 4 percent, and Pluronic L61 (ethylene oxide condensate with hydrophobic condensate of propylene oxide and propylene glycol (4 percent). Ten percent emulsion concentrates in DMF (dimethylformamide) were also prepared using as emulsifier 10 percent of a 50:50 ratio of Span (sorbitan ester of higher fatty acid) and Tween 80 (polyoxyethylene sorbitan monooleate). Only 506 was in complete solution in this emulsifiable concentrate. About 1 to 2 percent solids appeared to precipitate in the case of the 10 percent emulsion concentrate of 514. Because the complex decomposes in this carrier, it was made up just prior to use.

The field application was made on October 18, near Greenville, Mississippi. The application was tractor applied by means of overhead nozzles (no drop nozzles) at a gallonage of 39 G.P.A., a pressure of 25 p.s.i. to reduce drift in the wind since the wind at the time of application was approximately 10 m.p.h. with gusts up to 15 m.p.h.

The cotton used in the test was Stoneville 213 planted on a 4 × 4 scheme with rows 60 feet in length. At the time of treatment, the cotton was 4 or 5 feet in height with 60 to 70 percent open bolls. From the general appearance of the field, an estimate of final yield would be on the order of one and one-half bales per acre. The test plots were randomized consisting of 60 foot rows with 3 replicates. The field and the final results were very uniform and consistent.

First records were made on October 24, with final defoliation data obtained on November 4.

On October 24 data were recorded re P.R. phytotoxicity Rating) using a scale of 0 to 10 in which 10 indicates all leaves were killed and 0 indicates no effect. Percent defoliation (DEF) and percent desiccation (DES) was also determined. Final data on defoliation were recorded on November 4. Because of a severe frost which occurred the night before, it was not possible to obtain final data on percent desiccation. Some herbicides are so phytotoxic they inhibit the natural opening of the bolls, which is a very serious detriment to their use as a harvest aid on cotton. Therefore, on November 10 a count was made on the number of unopened bolls per plant. Data accumulated in the field are recorded in Table III.

TABLE III
Defoliant Activity of 506 and 514

| Chemical formulation | Rate, lbs./acre | October 24 | | | Nov. 4 percent DEF | Nov. 10 avg. No. of unopened bolls plant |
|---|---|---|---|---|---|---|
| | | P.R. | DEF | DES | | |
| 514 DMF (10%E.C.) | 2 | 10 | ¹50 | 50 | 98+ | 0 |
| | 1 | 10 | 75 | 25 | 85 | 0 |
| | ½ | 9+ | 85 | 15 | 90 | 0 |
| | ¼ | 7 | ⁴80 | 0 | 80 | 0 |
| 506 DMF (10%E.C.) | 2 | 10 | 75 | 25 | 98 | 0 |
| | 1 | 10 | 60 | 40 | 98 | 0 |
| | ½ | 9+ | 80 | 20 | 95 | 0 |
| | ¼ | 7 | ⁴85 | 0 | 85 | 0 |
| 514 50% wettable powder. | 2 | 10 | 80 | 20 | 98 | 0 |
| | 1 | 10 | 60 | 40 | 80 | 0 |
| | ½ | 9+ | 85 | 15 | 90 | 0 |
| | ¼ | 7 | 90 | 0 | 90 | 0 |
| 506 50% wettable powder. | 2 | 10 | 10 | 90 | 98 | 0 |
| | 1 | 10 | 10 | 90 | 85 | 0 |
| | ½ | 9+ | 85 | 15 | 90 | 0 |
| | ¼ | 7 | ²100T 50B | 0 | 100T 20B | 0 |
| Paraquat (4 lbs./gal.) (N,N'-dimethyl- 4,4'-dipyridylium | ³2 | 10 | 0 | 100 | 30 | 6 |
| | ³1 | 10 | 0 | 100 | 50 | 6 |
| | ½ | 10 | 60 | 40 | 80 | 2 |

TABLE III — Continued
Defoliant Activity of 506 and 514

| Chemical formulation | Rate, lbs./acre | October 24 | | | Nov. 4 percent DEF | Nov. 10 avg. No. of unopened bolls plant |
|---|---|---|---|---|---|---|
| | | P.R. | DEF | DES | | |
| dichloride). | ¼ | 5 | 100T 50B | 0 | 100T 50B | 0 |
| Diquat (4 lbs./gal.) (N,N'-ethylene- 2,2'-dipyridylium dibromide). | ³2 | 10 | 0 | 100 | 25 | 8 |
| | ³1 | 10 | 0 | 100 | 25 | 6 |
| | ½ | 9 | 20 | 80 | 40 | 0 |
| | ¼ | 4 | 50T OB | 35T 40B | 50T 0 | 0 |

¹ Leaves partially loose.
² Apparently not enough chemical reached bottom leaves.
³ Some "burn" on green bolls.
⁴ ¼ lb. rate would have picked very well with this degree of defoliation with almost no pin trash.

NOTE.—T=Top leaves. B=Bottom leaves.

From the P. R. values there appeared to be no significant difference between any of the materials tested with respect to phytotoxicity to the leaves and the plants, except at the low treatment level of one-quarter lb/acre where 506 and 514 were measurably more phytotoxic than Diquat (N,N'-ethylene-2,2'-dipyridylium dibromide) and Paraquat (N,N'-dimethyl-4,4'-dipyridlium dichloride). However, very significant differences in percent defoliation can be observed. In the case of Paraquat and Diquat, 6 days after application there was essentially no defoliation at effective herbicidal dosage levels (Phytotoxicity Rating of at least 7). Their action was essentially desiccation only. On the same date, both 506 and 514 produced 80–90 percent defoliation so that a very marked and significant difference between the action of 506 and 514 and the action of the commercial herbicides Diquat and Paraquat was apparent.

On November 4, both 506 and 514 had produced 98 percent plus defoliation at the 2 pounds per acre level of application and 90 to 95 percent defoliation at one-half pound per acre. 514 as a wettable powder produced 90 percent defoliation, even at the ¼-pound-per-acre-rate. On November 10, very significant date was obtained with respect to bolls opening. With 514 and 506, complete opening of the bolls occurred at all dose levels. With Diquat and Paraquat a high number of bolls remained unopened at their most effective phytotoxic levels.

The following data were obtained in an evaluation of harvest-aid chemicals tested at Stoneville, Miss.
I. Cultural:
  Cotton variety: DPL–16
  Planting dates:
    A. April 24
    B. May 5
  Soil type: Bosket fine sandy loam
  Fertilization: 500 lbs/A, 10–20–10, at planting
  Plant population: 39,000/Acre
  Irrigations:
    A. August 7
    B. August 4
  Plant condition: Drought stressed, 3–4 ft. tall, "cut-out"
  Flowering and fruiting: Normal
  Lint production: Approximately 500 lbs/Acre
II. Application:
  Rig: Hahn Hi-Boy
  Nozzles: 2 × 12 tips per row
    (1 over row, 1 over middle)
  Pressure: 90–100 psi
  Speed: 2-½mph
  Gallonage: 36 gals/Acre
  Plot size:
    A. Two 2-row plots, 150 ft. long
    B. Two 4-row plots, 66 ft. long
  Date:
    A. September 15
    B. October 15
  Treatment ratings (days after treatment):
    A. 1, 2, 4, 8, 14
    B. 4, 8, 12

Photographs taken (days after treatment)
A. 0, 7, 14
B. 0, 7

III Results:

TEST NO. 1 TABLE IV

| Chemical | Rate, lbs./acre | Percent defoliation and desiccation after— | | | | |
|---|---|---|---|---|---|---|
| | | 1 day | 2 days | 4 days | 8 days | 14 days |
| DEF* | 1¾ | 0 | ¹50A | 75A | 90A | 90A |
| 506 | ¼ | 0 | ²20X | 20A + 20X | 40A | 50A |
| 506 | ½ | ³25W | 60X | 40A + 50X | 75A + 10X | 80A + 5X |
| 506 | 1 | 50W | 70X | 50A + 50X | 70A + 20X | 75A + 15X |
| 506 | 2 | 80W | 100X | 40A + 60X | 60A + 40X | 70A + 30X |
| 514 | ¼ | 0 | 5X | 20A | 40A | 50A |
| 514 | ½ | 40W | 70X | 40A + 20X | 60A | 75A |
| 514 | 1 | 60W | 95X | 50A + 50X | 80A + 15X | 85A + 10X |
| 514 | 2 | 100W | 100X | 20A + 80X | 75X + 25X | 80A + 20X |

¹ Percent abscission (A).
² Percent desiccation (X).
³ Percent wilted (W).
*TM—commercial defoliant.

TEST NO. 2 (B) TABLE V

| Chemical | Rate, lbs./acre | Percent defoliation and desiccation after— | | |
|---|---|---|---|---|
| | | 4 days | 8 days | 12 days |
| DEF* | 1¾ | ¹70A | 85A | 95A |
| 506 | ½ | 60A + ²5X | 75A + 5X | 75A + 5X |
| 506 | ¾ | 70A + 10X | 85A + 15X | 85A + 15X |
| 506 | 1 | 65A + 35X | 75A + 25X | 80A + 20X |
| 514 | ½ | 70A + 5X | 80A + 5X | 85A + 5X |
| 514 | ¾ | 75A + 15X | 85A + 15X | 85A + 15X |
| 514 | 1 | 70A + 25X | 75A + 25X | 80A + 15X |

¹ Percent defoliation (A).
² Percent desiccation (X).
*TM—commercial defoliant.

IV. Discussion:

Each chemical was mixed with a 3 gallon volume of water just prior to application. No problems were encounted in mixing or applying any of the chemicals when the agitation system of the spray machine was used. Compounds 506 and 514 were provided in the form of a silica (HiSil)-based 50% wettable powder. A non-ionic sticker-spreader (X-77) was incorporated in the liquid preparation just prior to use, at a rate of ca. one-half pint per 100 gallons.

Both 506 and 514 treatments at acre rates of one-half lb. or higher resulted in considerable wilting of leaves within the first 24 hours, and by the end of 48 hours these leaves were desiccated. Most of these desiccated leaves defoliated by the end of 14 days. The observed wiltant effect is particularly interesting and desirable from the standpoint of enabling quick harvesting, which is of great interest in certain areas, such as Northern and Western Texas, where entire crops are lost or substantially lost each year because of storms which occur after the bolls are sufficiently developed for harvesting, but before the leaves can be dropped or desiccated by previously available agents and procedure.

The amount of defoliation indicated occurred by the fourth day after application, and the leaf drop increased gradually for the next 10 days to a high of 75-80 percent in some plots. In most cases, the 20-25 percent undefoliated leaves were desiccated and "stuck" to the plant.

Undesirable regrowth on the 506- and 514-treated plants was no different from those treated with a phosphate type defoliant. The terminal buds on plants treated with the higher rates (one-half lb. or higher) of 506 and 514 appeared to have been killed.

There was no apparent lint stain in any of the treated plots.

In a similar series of tests conducted in substantially the same manner at Shafter, California, using mature SJl-Acala cotton, in which the degree of desiccation (leaf) and degree of desiccation (boll) was recorded, compound 514 at 1.0 lb/A was recorded as "good" 3 days after application and 7 days after application, with a percent defoliation and rating of "85, good" ten days after application, whereas at 2.0 lbs/A, the corresponding ratings were "very good," "very good," and "90, good." In contrast, the best available commercial defoliant, DEF (TM), at 2 pints per acre 3 days after application was rated only "slight," after 7 days "good," and after 10 days "90, good."

In another similar series of tests conducted in substantially the same manner in Arizona against mature Deltapine 16 cotton, the compounds 506 and 514 proved to be effective desiccant-defoliants when applied at the rate of 2, 1, 0.5, and 0.25 lbs/Acre using approximately 37 gallons of water per acre with one pint of nonionic surface active agent X-77 (compounded product of alkyl aryl polyethoxyethanol and free fatty acids— Colloidal Products Corp.) per 100 gallons. The initial high degree of desiccation four days after treatment, shifting to a high degree of defoliation by 14 days after treatment, especially at rates of one pound per acre and higher, and particularly for compound 514, as recorded from the average of three replicates, showed the compounds to be effective desiccant-defoliants of this particular type of cotton under the conditions encountered. At the 2-lb/A rate, compound 514 was an especially effective desiccant.

In another similar series of tests conducted in Texas against mature Paymaster 202 cotton, the compounds 506 and 514 were again shown to be effective desiccant-defoliants at rates of 0.5, 1.0, and 2.0 lbs/A, being applied in a volume of 14 gals/A using 0.5 percent surfactant (surfactant WK, duPont — dodecyl ether of polyethylene glycol). Defoliation and desiccation were evaluated visually after 4 and 11 days, and figures between 0 and 10 assigned to indicate no apparent response to complete defoliation or desiccation. Plots were 2 rows by 40 feet, with a blank row between. When statistically evaluated against numerous other test compounds, including commercial test compounds, including DEF (TM), Paraquat (TM), and Paraquat (TM) plus Arsenic Acid, after 4 days, 506 was best and 514 next best as a defoliant (at 2.0 and 0.5 lbs./A, respectively); after 11 days, 514 was best as a defoliant (2.0 lbs/A rate), and after 11 days, 506 was best and 514 next best as a desiccant (rates of 0.5 and 0.5 lbs/A, respectively), once again indicating the effectiveness of the compounds in these respects. In addition, as to defoliation, after 4 days, 506 0.5 lb/A) and 514 (2.0 lb/A) were tied with others for effectiveness and, after 11 days, 506 (1.0 lb/A) was alone in third place. After 11 days 514 (2.0 lb/A) was tied with one another in third place as to desiccation effect. Among the reported conclusions was that, in this test series, "low rates of both compounds (506 and 514) promoted desiccation that was superior to that achieved with Paraquat, arsenic acid, combinations of the two, or DEF." In further field and greenhouse tests conducted for the purpose of observing degree of suppression of opening of mature cotton bolls, in comparison with Paraquat (TM), Diquat (TM), DEF (TM), and Folex (TM), the compounds 506 and 514 were shown to be at least as effective as these other commercial products as defoliant-desiccants and were found to be much superior from the standpoint of not suppressing the opening of mature cotton bolls, a very important consideration as far as facilitating completeness of picking from individual plants, fields, and yields per acre.

The respective significance of defoliation, desiccation, and wilt will be immediately apparent to one skilled in the art.

Where stripper cotton harvesting procedures are applied, as in broadcast or close-row plantings, desiccation is preferred as a harvest aid procedure to eliminate pick-up of defoliated green leaves, i.e., the more desiccation as opposed to defoliation the better for stripper harvesting. Conversely, where spindle harvesting equipment and procedure is the approach of choice, defoliation is definitely the harvest aid procedure of choice to eliminate as many green leaves as possible from the spindle harvester pick-up. Further, as already stated, where an extremely rapid harvest of cotton is desired, rapid wilt permits harvest promptly after application of the harvest aid, and this procedure presently holds much promise for commercial application. Whatever the preferred mode or procedure for aiding harvest, the compounds 506 and 514 are clearly suitable and adaptable thereto, without impeding the opening of mature cotton bolls as shown in the foregoing. Obviously, the time required for effective desiccation and/or defoliation with a particular agent is also of great interest, and the agents of the invention are, therefore, also advantageous from the standpoint of producing the desired effect in a relatively short period after application.

Where formulated and tested as cotton defoliant-desiccants in the manner of the foregoing, as reported for 514 and 506, the compounds of Examples 4 through 11 are also shown to be effective and superior cotton defoliant-desiccants.

HERBICIDAL UTILITY

The compounds 506 and 514 were provided in the form of 50 percent silica-based wettable powder formulation and were applied by spraying on growing vegetation in a post-emergence procedure at rates of 1, 2 and 3 pounds of such formulation per acre in water using up to about 100, preferably approximately 30–50, gallons of water per acre and approximately one-half to one pint of Colloidal Products Corp. surfactant X–77 (nonionic compounded product of alkyl aryl polyethoxyethanol and free fatty acids) per 100 gallons of water, the latter being incorporated just before use. Suitable wettable powder compositions are identified under the "-Defoliant-Desiccant" section and are also useful for herbicidal applications.

Pre-plant incorporation and pre-emergence activity was minimal, but the compounds were very good post-emergence herbicides, giving a high rate of stand reduction and subsequent growth reduction. Regrowth in the post-emergence plots with both 506 and 514 is much lower than to be expected from a strictly contact herbicide, e.g., 60 days after treatment, only a few weeds appeared in the 514 post-emergence plots, as shown by tests in Hawaii, the results of which are shown in the following tables, in which the severe damage to or destruction of the growing vegetation is shown in percent:

TABLE VI.—KEKAHA SCREENING TRIAL, KAUAI, HAWAII (HERBICIDES)

[S=Percent stand reduction, G=Percent growth reduction, PPI=Pre plant incorporation, PRE=Pre plant application, POST=Post emergence.]

Chemical: GLC-506

| Time applic. | PPI | | PPI | | PPI | | PRE | | PRE | | PRE | | POST | | POST | | POST | |
|---|---|---|---|---|---|---|---|---|---|---|---|---|---|---|---|---|---|---|
| Rate | .50 | | 1.0 | | 1.5 | | .50 | | 1.0 | | 1.5 | | .50 | | 1.0 | | 1.5 | |
| Plot | 211 | | 212 | | 213 | | 214 | | 215 | | 216 | | 217 | | 218 | | 219 | |
| | S | G | S | G | S | G | S | G | S | G | S | G | S | S | S | G | S | G |
| Alfalfa | 0 | 0 | 0 | 0 | 0 | 0 | 0 | 0 | 0 | 0 | 0 | 0 | 100 | 100 | 100 | 100 | 100 | 100 |
| Trefoil | 0 | 0 | 0 | 0 | 0 | 0 | 0 | 0 | 0 | 0 | 0 | 0 | 100 | 100 | 100 | 100 | 100 | 100 |
| Red clover | 0 | 0 | 0 | 0 | 0 | 0 | 0 | 0 | 0 | 0 | 0 | 0 | 100 | 100 | 100 | 100 | 100 | 100 |
| White clover | 0 | 0 | 0 | 0 | 0 | 0 | 0 | 0 | 0 | 0 | 0 | 0 | 100 | 100 | 100 | 100 | 100 | 100 |
| Rape | 0 | 0 | 0 | 0 | 0 | 0 | 0 | 0 | 0 | 0 | 0 | 0 | 90 | 80 | 90 | 100 | 100 | 100 |
| Broccoli | 0 | 0 | 0 | 0 | 0 | 0 | 0 | 0 | 0 | 0 | 0 | 0 | 90 | 80 | 100 | 100 | 100 | 100 |
| Carrots | 0 | 0 | 0 | 0 | 0 | 0 | 0 | 0 | 0 | 0 | 0 | 0 | 90 | 80 | 100 | 100 | 100 | 100 |
| Onions | 0 | 0 | 0 | 0 | 0 | 0 | 0 | 0 | 0 | 0 | 0 | 0 | | | | | | |
| Spinach | 0 | 0 | 0 | 0 | 0 | 0 | 0 | 0 | 0 | 0 | 0 | 0 | 100 | 100 | 100 | 100 | 100 | |
| Lettuce | | | | | | | | | | | | | | | | | | |
| Rice | 0 | 0 | 0 | 0 | 0 | 0 | 0 | 0 | 0 | 0 | 0 | 0 | 0 | 0 | 90 | 90 | 50 | 50 |
| Annual ryegrass | 0 | 0 | 0 | 0 | 0 | 0 | 0 | 0 | 0 | 0 | 0 | 0 | 40 | 40 | 80 | 80 | 90 | 80 |
| Sugar beets | 0 | 0 | 0 | 0 | 0 | 0 | 0 | 0 | 0 | 0 | 0 | 0 | 100 | 100 | 100 | 100 | 100 | 100 |
| Cucumber | 0 | 0 | 0 | 0 | 0 | 0 | 0 | 0 | 0 | 0 | 0 | 0 | 30 | 30 | 90 | 80 | 100 | 100 |
| Flax | 0 | 0 | 0 | 0 | 0 | 0 | 0 | 0 | 0 | 0 | 0 | 0 | 80 | 80 | 100 | 100 | 100 | 100 |
| Lentils | 0 | 0 | 0 | 0 | 0 | 0 | 0 | 0 | 0 | 0 | 0 | 0 | 30 | 20 | 100 | 100 | 100 | 100 |
| Morning glory | 0 | 0 | 0 | 0 | 0 | 0 | 0 | 0 | 0 | 0 | 0 | 0 | 30 | 60 | 100 | 100 | 90 | 80 |
| Safflower | 0 | 0 | 0 | 0 | 0 | 0 | 0 | 0 | 0 | 0 | 0 | 0 | 100 | 100 | 100 | 100 | 100 | 100 |
| Cotton | 0 | 0 | 0 | 0 | 0 | 0 | 0 | 0 | 0 | 0 | 0 | 0 | 90 | 70 | 100 | 100 | 100 | 100 |
| Wheat | 0 | 0 | 0 | 0 | 0 | 0 | 0 | 0 | 0 | 0 | 0 | 0 | 0 | 30 | 30 | 60 | 50 | 60 |
| Oats | 0 | 0 | 0 | 0 | 0 | 0 | 0 | 0 | 0 | 0 | 0 | 0 | 30 | 30 | 30 | 60 | 50 | 70 |
| Rye | 0 | 0 | 0 | 0 | 0 | 0 | 0 | 0 | 0 | 0 | 0 | 0 | 0 | 30 | 30 | 60 | 100 | 100 |
| Barley | 0 | 0 | 0 | 0 | 0 | 0 | 0 | 0 | 0 | 0 | 0 | 0 | 20 | 30 | 50 | 70 | 100 | 100 |
| Soybeans | 0 | 0 | 0 | 0 | 0 | 0 | 0 | 0 | 0 | 0 | 0 | 0 | 90 | 90 | 100 | 100 | 100 | 100 |
| Greenbeans | 0 | 0 | 0 | 0 | 0 | 0 | 0 | 0 | 0 | 0 | 0 | 0 | 90 | 90 | 90 | 90 | 100 | 100 |
| Peas | 0 | 0 | 0 | 0 | 0 | 0 | 0 | 0 | 0 | 0 | 0 | 0 | 40 | 50 | 90 | 80 | 80 | 80 |
| Field corn | 0 | 0 | 0 | 0 | 0 | 0 | 0 | 0 | 0 | 0 | 0 | 0 | 80 | 80 | 60 | 50 | 80 | 50 |
| Sunflower | 0 | 0 | 0 | 0 | 0 | 0 | 0 | 0 | 0 | 0 | 0 | 0 | 90 | 80 | 90 | 80 | 100 | 100 |
| Peanuts | 0 | 0 | 0 | 0 | 0 | 0 | 0 | 0 | 0 | 0 | 0 | 0 | 0 | 20 | 30 | 40 | 50 | 60 |
| Potatoes | 0 | 0 | 0 | 0 | 0 | 0 | 0 | 0 | 0 | 0 | 0 | 0 | | | | | | |
| Sugar cane | 0 | 0 | 0 | 0 | 0 | 0 | 0 | 0 | 0 | 0 | 0 | 0 | | | | | | |
| Tomatoes | 0 | 0 | 0 | 0 | 0 | 0 | 0 | 0 | 0 | 0 | 0 | 0 | 90 | 70 | 90 | 90 | 100 | 100 |

TABLE VII.—KEKAHA SCREENING TRIAL, KAUAI, HAWAII (HERBICIDES)

[S=Percent stand reduction, G=Percent growth reduction, PPI=Pre plant incorporation, PRE=Pre plant application, POST=Post emergence.]

Chemical: GLC-514

| Time applic. | PPI | | PPI | | PPI | | PRE | | PRE | | PRE | | POST | | POST | | POST | |
|---|---|---|---|---|---|---|---|---|---|---|---|---|---|---|---|---|---|---|
| Rate | .50 | | 1.0 | | 1.5 | | .50 | | 1.0 | | 1.5 | | .50 | | 1.0 | | 1.5 | |
| Plot | 220 | | 221 | | 222 | | 355 | | 356 | | 358 | | 357 | | 359 | | 360 | |
| | S | G | S | G | S | G | S | G | S | G | S | G | S | G | S | G |
| Alfalfa | 0 | 0 | 0 | 0 | 0 | 0 | 0 | 0 | 0 | 0 | 0 | 0 | 100 | 100 | 100 | 100 | 100 | 100 |
| Trefoil | 0 | 0 | 0 | 0 | 0 | 0 | 0 | 0 | 0 | 0 | 0 | 0 | 100 | 100 | 100 | 100 | 100 | 100 |
| Red clover | 0 | 0 | 0 | 0 | 0 | 0 | 0 | 0 | 0 | 0 | 0 | 0 | 100 | 100 | 100 | 100 | 100 | 100 |
| White clover | 0 | 0 | 0 | 0 | 0 | 0 | 0 | 0 | 0 | 0 | 0 | 0 | 100 | 100 | 100 | 100 | 100 | 100 |
| Rape | 0 | 0 | 0 | 0 | 0 | 0 | 0 | 0 | 0 | 0 | 0 | 0 | 80 | 80 | 100 | 100 | 100 | 100 |
| Broccoli | 0 | 0 | 0 | 0 | 0 | 0 | 0 | 0 | 0 | 0 | 0 | 0 | 90 | 90 | 100 | 100 | 100 | 100 |
| Carrots | 0 | 0 | 0 | 0 | 0 | 0 | 0 | 0 | 0 | 0 | 0 | 0 | 100 | 100 | 100 | 100 | 100 | 100 |
| Onions | 0 | 0 | 0 | 0 | 0 | 0 | 0 | 0 | 0 | 0 | 0 | 0 | | | | | | |
| Spinach | 0 | 0 | 0 | 0 | 0 | 0 | 0 | 0 | 0 | 0 | 0 | 0 | 100 | 100 | 100 | 100 | 100 | 100 |

TABLE VII.—KEKAHA SCREENING TRIAL, KAUAI, HAWAII (HERBICIDES)—Continued

[S=Percent stand reduction, G=Percent growth reduction, PPI=Pre plant incorporation, PRE=Pre plant application, POST=Post emergence.]

| Chemical: GLC-514 | | | | | | | | | | | | | | | | | | |
|---|---|---|---|---|---|---|---|---|---|---|---|---|---|---|---|---|---|---|
| Time applic. | PPI | | PPI | | PPI | | PRE | | PRE | | PRE | | POST | | POST | | POST | |
| Rate | .50 | | 1.0 | | 1.5 | | .50 | | 1.0 | | 1.5 | | .50 | | 1.0 | | 1.5 | |
| Plot | 220 | | 221 | | 222 | | 355 | | 356 | | 358 | | 357 | | 359 | | 360 | |
| | S | G | S | G | S | G | S | G | S | G | S | G | S | G | S | G | S | G |
| Lettuce | | | | | | | | | | | | | | | | | | |
| Tomatoes | 0 | 0 | 0 | 0 | 0 | 0 | 0 | 0 | 0 | 0 | 0 | 0 | 100 | 100 | 100 | 100 | 100 | 100 |
| Rice | 0 | 0 | 0 | 0 | 0 | 0 | 0 | 0 | 0 | 0 | 0 | 0 | 100 | 100 | 100 | 100 | 100 | 100 |
| Annual ryegrass | 0 | 0 | 0 | G | 0 | 0 | 0 | 0 | 0 | 0 | 0 | 0 | 100 | 100 | 100 | 100 | 100 | 100 |
| Sugar beets | 0 | 0 | 0 | 0 | 0 | 0 | 0 | 0 | 0 | 0 | 0 | 0 | 90 | 0 | 100 | 100 | 100 | 100 |
| Cucumber | 0 | 0 | 0 | 0 | 0 | 0 | 0 | 0 | 0 | 0 | 0 | 0 | 80 | 60 | 100 | 100 | 100 | 100 |
| Flax | 0 | 0 | 0 | 0 | 0 | 0 | 0 | 0 | 0 | 0 | 0 | 0 | | 100 | 100 | 100 | 100 | 100 |
| Lentils | 0 | 0 | 0 | 0 | 0 | 0 | 0 | 0 | 0 | 0 | 0 | 0 | 100 | 100 | 100 | 100 | 100 | 100 |
| Morning glory | 0 | 0 | 0 | 0 | 0 | 0 | 0 | 0 | 0 | 0 | 0 | 0 | 0 | 30 | 90 | 80 | 100 | 100 |
| Safflower | 0 | 0 | 0 | 0 | 0 | 0 | 0 | 0 | 0 | 0 | 0 | 0 | 100 | 100 | 100 | 100 | 100 | 100 |
| Cotton | 0 | 0 | 0 | 0 | 0 | 0 | 0 | 0 | 0 | 0 | 0 | 0 | 90 | 70 | 100 | 100 | 100 | 100 |
| Wheat | 0 | 0 | 0 | 0 | 0 | 0 | 0 | 0 | 0 | 0 | 0 | 0 | 100 | | 100 | 100 | 100 | 100 |
| Oats | 0 | 0 | 0 | 0 | 0 | 0 | 0 | 0 | 0 | 0 | 0 | 0 | 100 | | 100 | 100 | 100 | 100 |
| Rye | 0 | 0 | 0 | 0 | 0 | 0 | 0 | 0 | 0 | 0 | 0 | 0 | 100 | | 100 | 100 | 100 | 100 |
| Barley | 0 | 0 | 0 | 0 | 0 | 0 | 0 | 0 | 0 | 0 | 0 | 0 | 100 | | 100 | 100 | 100 | 100 |
| Soybeans | 0 | 0 | 0 | 0 | 0 | 0 | 0 | 0 | 0 | 0 | 0 | 0 | 90 | 90 | 100 | 100 | 100 | 100 |
| Greenbeans | 0 | 0 | 0 | 0 | 0 | 0 | 0 | 0 | 0 | 0 | 0 | 0 | 100 | 100 | 100 | 100 | 100 | 100 |
| Peas | 0 | 0 | 0 | 0 | 0 | 0 | 0 | 0 | 0 | 0 | 0 | 0 | 90 | 90 | 100 | 100 | 100 | 100 |
| Field corn | 0 | 0 | 0 | 0 | 0 | 0 | 0 | 0 | 0 | 0 | 0 | 0 | 90 | 90 | 100 | 100 | 100 | 100 |
| Sunflower | 0 | 0 | 0 | 0 | 0 | 0 | 0 | 0 | 0 | 0 | 0 | 0 | 90 | 90 | 100 | 100 | 100 | 100 |

In addition, in these same tests, the volunteer weeds *Eluesine indica* and *Emila sonchifolia* were both completely destroyed by compound 514 at all levels of post-emergence application, whereas compound 506 completely destroyed the latter at all post-emergence application levels and the former to the extent of 90–70–90–80–90–80 percent, with reference to the foregoing tables.

In winter screening trials conducted in a similar manner in Oregon, the post-emergence herbicidal activity of 506 and 514 was demonstrated, the reading being taken 30 days after application, against oats, rye, barley, and other grasses, with total chlorosis being the ultimate fate of the plant, chlorosis appearing to be progressive and moving from leaf tips downward. The application was effected in the same manner as given for the foregoing Hawaiian evaluations.

In a similar series of trials conducted in the same manner in Texas, the compound 514 showed a very broad spectrum of herbicidal control in post-emergence evaluations, in which the plants tested (including those mentioned in the following) were at least substantially severely damaged and in most cases completely destroyed. Post-emergence selectivity was shown by 506 as to quackgrass (Agropyron repens), mullein (verbascum thapsus), and pigweed (Amaranthus sp.) in the multicropping vegetable areas and ragweed (Ambrosia trifida) in sorghum, as well as a pre-emergence selectivity for common lambsquarters (Chenopodium album) at three pounds of 50 percent wettable powder per acre.

In a further series of late-year multicrop screening evaluations conducted in Oregon in the same manner as given in the foregoing, the compounds 506 and 514 were found to be effective post-emergence herbicides, substantially severely damaging or completely destroying the plants to which applied. With both 514 and 506, some selectivity was found, although activity on broadleaf and weedy grass was nearly 100 percent even at the lowest rate. The results are shown in the following two tables, VIII and IX, in which E signifies English

TABLE VIII

| Trial results | Oregon | | | | Eval. No. 1 | |
|---|---|---|---|---|---|---|
| Chemical | 506 | | 506 | | 506 | |
| Time of application | Post, early | | Post, early | | Post, early | |
| Method of application | Broadcast | | Broadcast | | Broadcast | |
| Active ingredient/acre | 0.5 E | | 1.0 E | | 1.5 E | |
| | SR | GR | SR | GR | SR | GR |
| Rape | 100 | 100 | 100 | 100 | 100 | 100 |
| Wild mustard | 100 | 100 | 100 | 100 | 100 | 100 |
| Annual ryegrass | 100 | 100 | 100 | 100 | 100 | 100 |
| Wild oats | 100 | 100 | 100 | 100 | 100 | 100 |
| Common vetch | 60 | 30 | 80 | 60 | 80 | 70 |
| Oats (Fall) | 90 | 90 | 100 | 100 | 100 | 100 |
| Rye | 100 | 100 | 100 | 100 | 100 | 100 |
| Barley | 90 | 90 | 100 | 100 | 100 | 100 |
| Flax | 100 | 100 | 100 | 100 | 100 | 100 |
| Mouseear chickweed | 100 | 100 | 100 | 100 | 100 | 100 |
| Annual bluegrass | 80 | 70 | 100 | 100 | 100 | 100 |
| Broadleaf crops | 86 | 76 | 93 | 86 | 93 | 90 |
| Broadleaf weeds | 100 | 100 | 100 | 100 | 100 | 100 |
| Grass crops | 93 | 93 | 100 | 100 | 100 | 100 |
| Grass weeds | 93 | 90 | 100 | 100 | 100 | 100 |

TABLE IX

| Trial results | Oregon | | | | Eval. No. 1 | |
|---|---|---|---|---|---|---|
| Chemical | 514 | | 513 | | 514 | |
| Time of application | Post, early | | Post, early | | Post, early | |
| Method of application | Broadcast | | Broadcast | | Broadcast | |
| Active ingredient/acre | 0.5 E | | 1.0 E | | 1.5 E | |
| | SR | GR | SR | GR | SR | GR |
| Rape | 90 | 90 | 90 | 90 | 100 | 100 |
| Wild mustard | 100 | 100 | 100 | 100 | 100 | 100 |
| Annual ryegrass | 100 | 100 | 100 | 100 | 100 | 100 |
| Wild oats | 100 | 100 | 100 | 100 | 100 | 100 |
| Common vetch | 0 | 0 | 20 | 20 | 30 | 30 |
| Oats (Fall) | 100 | 100 | 100 | 100 | 100 | 100 |
| Rye | 100 | 100 | 100 | 100 | 100 | 100 |
| Barley | 100 | 100 | 100 | 100 | 100 | 100 |
| Flax | 100 | 100 | 100 | 100 | 100 | 100 |
| Mouseear chickweed | 100 | 100 | 100 | 100 | 100 | 100 |
| Annual bluegrass | 100 | 100 | 100 | 100 | 100 | 100 |
| Broadleaf crops | 63 | 63 | 70 | 70 | 76 | 76 |
| Broadleaf weeds | 100 | 100 | 100 | 100 | 100 | 100 |
| Grass crops | 100 | 100 | 100 | 100 | 100 | 100 |
| Grass weeds | 100 | 100 | 100 | 100 | 100 | 100 | units of pounds per acre and SR and GR signify percentage stand reduction and growth reduction, respectively. In addition, some pre-emergence activity against broadleaf crops and weeds and grass crops and weeds was shown by 514 at the 1.5 pounds of active ingredient per acre level.

When formulated and tested as herbicides in the manner of the foregoing, as reported for 514 and 506, the compounds of Examples 4 through 6 are also shown to be effective herbicides.

The present invention is not to be considered limited to the exact materials, compounds, compositions, proportions, methods, or procedures shown and described, as obvious modifications and equivalents will be apparent to one skilled in the art and the invention is therefore to be limited only by the full scope of the appended claims.

What is claimed is:

1. A dipyridylium dihalide halogen complex of the formula

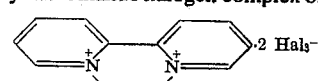

wherein the halogen of $Hal_3^-$ has an atomic weight of 35 to 80, inclusive.

2. A compound of Claim 1 having the formula

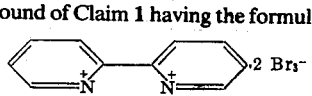

3. A compound of claim 1 which is N,N'-ethylene-2,2'-dipyridylium bischlorodibromide.

4. A compound of claim 1 which is N,N'-ethylene-2,2'-dipyridylium bistribromide.

5. N,N'-ethylene-2,2'-dipyridylium bistrihalide wherein the halogen has a atomic weight from 35 to 80, inclusive.

* * * * *

UNITED STATES PATENT OFFICE
CERTIFICATE OF CORRECTION

Patent No. 3,674,788                Dated July 4, 1972

Inventor(s) Robert M. Thomas, Fred R. Gerns, and John L. Sands

It is certified that error appears in the above-identified patent and that said Letters Patent are hereby corrected as shown below:

Column 3, in the Heading of the Table: Delete "$H_2I_3^-$" and insert -- $Hal_3^-$ --.

Column 3, in the Table, Compounds 8, 9, and 10 in the "Y" column: Delete "$C_3H_5$" in each occurrence and insert -- $C_3H_6$ -- in each occurrence.

Column 5, line 24:     After "962 g." insert an asterisk (*).
after line 26:     Insert -- *Combined yield of two replicate reactions.--

Column 6, Table II, under b. Melting Points, "(95% titer," should read -- (95% $Br_2$ titer, --.

Column 11, line 24:     Cancel "11" and insert -- 6 --.

In Table VI, the column in the Table entitled "POST .50 217 S. S.", the "S" in the second occurrence should be "G".

In Table VII, the columns in the Table reading "PRE 1.5 358" and "POST .50 357" should read: --PRE 1.5 357 -- and -- POST .50 358 --.

In Table IX (column 14 of the patent), under the heading "Oregon" the number "513" should read -- 514 --.

In column 14, line 76 (Claim 5), cancel "a" and insert -- an --.

Signed and sealed this 26th day of December 1972.

(SEAL)
Attest:

EDWARD M. FLETCHER, JR.
Attesting Officer

ROBERT GOTTSCHALK
Commissioner of Patents